United States Patent
Lee et al.

(10) Patent No.: US 11,321,059 B2
(45) Date of Patent: May 3, 2022

(54) PERSONALIZED DESIGN LAYOUT FOR APPLICATION SOFTWARE

(71) Applicant: International Business Machines Corporation, Armonk, NY (US)

(72) Inventors: Sunhwan Lee, San Mateo, CA (US); Lei Huang, Mountain View, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/985,327

(22) Filed: Aug. 5, 2020

(65) Prior Publication Data

US 2021/0026607 A1    Jan. 28, 2021

Related U.S. Application Data

(63) Continuation of application No. 16/455,205, filed on Jun. 27, 2019, now Pat. No. 10,776,084.

(51) Int. Cl.
*G06F 8/38* (2018.01)
*G06F 17/16* (2006.01)
*G06F 17/18* (2006.01)

(52) U.S. Cl.
CPC ............... *G06F 8/38* (2013.01); *G06F 17/16* (2013.01); *G06F 17/18* (2013.01)

(58) Field of Classification Search
CPC ............. G06F 8/38; G06F 17/16; G06F 17/18
USPC ......................................................... 715/762
See application file for complete search history.

(56) References Cited

U.S. PATENT DOCUMENTS

| | | | |
|---|---|---|---|
| 9,280,784 B2* | 3/2016 | Barnett | G06Q 30/0242 |
| 9,495,175 B2 | 11/2016 | Krishnamoorthy et al. | |
| 10,902,349 B2* | 1/2021 | Ghosh | G06F 11/30 |
| 2014/0165001 A1* | 6/2014 | Shapiro | G06F 16/54 |
| | | | 715/811 |

(Continued)

FOREIGN PATENT DOCUMENTS

WO    2017/212466 A1    12/2017

OTHER PUBLICATIONS

Andrei et al., "Probabilistic Formal Analysis of App Usage to Inform Redesign," arXiv:1510.07898v1, arXiv.org, Oct. 27, 2015, 13 pages.

(Continued)

*Primary Examiner* — William D Titcomb
(74) *Attorney, Agent, or Firm* — Amin, Turocy & Watson, LLP

(57) ABSTRACT

Techniques regarding personalizing one or more design layouts of a user interface for application software are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a design component that can generate a design layout of a user interface for application software by adjusting an initial design layout of the user interface based on interactions via the user interface and a design perturbation preference associated with the initial design layout.

20 Claims, 12 Drawing Sheets

(56) References Cited

U.S. PATENT DOCUMENTS

| | | | |
|---|---|---|---|
| 2016/0180017 A1* | 6/2016 | Savian | B64F 5/00 |
| | | | 703/8 |
| 2016/0275269 A1* | 9/2016 | Buyse | G06F 19/00 |
| 2016/0360336 A1* | 12/2016 | Gross | H04M 1/72403 |
| 2017/0024404 A1* | 1/2017 | Tocchini | G06F 40/186 |
| 2017/0168653 A1 | 6/2017 | Spiess et al. | |
| 2018/0101391 A1 | 4/2018 | Cunha et al. | |
| 2018/0329727 A1* | 11/2018 | Cao | G06F 16/9577 |

OTHER PUBLICATIONS

Gajos et al. Automatically Generating Personalized User Interfaces with SUPPLE. https:/lwww.eecs.harvard.edu/kgajos/papers/2010/gajos10supple-aij .pdf (2010).
Bao. Fewer clicks and less frustration: reducing the cost of reaching the right folder. IUI '06 Proceedings of the 11th International conference on Intelligent user interfaces pp. 178-185 (Jan. 1, 2006).
Unknown, "Cognitive Role-Based Policy Assignment and User Interface Modification for Mobile Electronic Devices," U.S. Appl. No. 16/022,490, filed Jun. 28, 2018, 54 pages.
Mell, Peter, et al. "The NIST Definition of Cloud Computing." National Institute of Standards and Technology. Sep. 2011. 7 pages.
Liu, et al. "An Adaptive User Interface Based on Personalized Learning" IEEE Computer Society, 2003. 6 pages.
Non-Final Office Action received for U.S. Appl. No. 16/455,205 dated Mar. 2, 2020, 26 pages.
U.S. Appl. No. 16/455,205, filed Jun. 27, 2019.

* cited by examiner

PERSONALIZED DESIGN LAYOUT FOR APPLICATION SOFTWARE

BACKGROUND

The subject disclosure relates to personalizing one or more design layouts of a user interface for application software, and more specifically, to altering a design layout based on past interactions with the user interface and one or more design perturbation preferences.

Application software can be accessed and/or utilized via one or more electronic devices via one or more user interfaces. For example, one or more user interfaces can enable an individual to interact with application software via one or more computer devices, such as a smartphone. A design layout can define the positioning of one or more objects of the application software within the user interface. Traditionally, a standard design layout is developed for the user interface irrespective of the user's preferences. Thereby, the resulting design layout can necessitate a large amount of navigation through the user interface by the user in order to transition from one object of interest to another.

Adaptive user interfaces can personalize the design layout by learning a user's behaviors, available electronic devices, and/or abilities. However, conventional adaptive user interfaces can generate a personalized design layout that is substantially different than the standard design layout associated with the application software. Users familiar with the standard design layout can find it difficult to navigate the personalized design layout due to the differences. Thus, conventional adaptive user interfaces can personalize the design layout to the detriment of user navigation of the user interface.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can personalize design layouts of a user interface for application software are described.

According to an embodiment, a system is provided. The system can comprise a memory that can store computer executable components. The system can also comprise a processor, operably coupled to the memory, and that can execute the computer executable components stored in the memory. The computer executable components can comprise a design component that can generate a design layout of a user interface for application software by adjusting an initial design layout of the user interface based on interactions via the user interface and a design perturbation preference associated with the initial design layout. An advantage of such a system can be that the generated design layout can strike a balance between personalization and design perturbation in accordance with one or more user preferences.

In some examples, the system can further comprise an optimization component that can determine the design layout by reducing a navigation distance between objects comprised within the initial design layout to achieve an expected navigation distance based on a probability matrix derived from the interactions. An advantage of such a system can be that design layout can be customized to accommodate an individual's pattern of interactions with the user interface.

According to an embodiment, a computer-implemented method is provided. The computer-implemented method can comprise generating, by a system operatively coupled to a processor, a design layout of a user interface for application software by adjusting an initial design layout of the user interface based on interactions via the user interface and a design perturbation preference associated with the initial design layout. An advantage of such a computer-implemented method can be the adaptation of a user interface to meet a user's pattern of operation while also meeting the user's preference regarding the amount of deviation from the initial design layout.

In some examples, the computer-implemented method can comprise analyzing, by the system, the interactions to determine session data that can characterize a sequence in which objects of the initial design layout are interacted. Also, the computer-implemented method can comprise generating, by the system, a transition probability matrix that can characterize a probability of navigating from a first object from the objects to a second object from the objects based on the session data. Further, the interactions can comprise at least one member selected from a group consisting of engagement of the objects via the user interface and prolonged display of the objects via the user interface. An advantage of such a computer-implemented method can be that the design layout can be personalized based on explicit and/or implicit interactions with one or more objects via the user interface.

According to an embodiment, a computer program product for improving operability of application software is provided. The computer program product can comprise a computer readable storage medium having program instructions embodied therewith. The program instructions can be executable by a processor to cause the processor to generate, by the processor, a design layout of a user interface for the application software by adjusting an initial design layout of the user interface based on interactions via the user interface and a design perturbation preference associated with the initial design layout. An advantage of such a computer program product can be a reduction in the expected amount of user interface navigation experienced by a user during operation of the application software.

In some examples, the program instructions can further cause the processor to analyze, by the processor, the interactions to determine session data that can characterize a sequence in which objects of the initial design layout are interacted. The program instructions can also cause the processor to generate, by the processor, a transition probability matrix that can characterize a probability of navigating from a first object from the objects to a second object from the objects based on the session data. Further, the program instructions can cause the processor to reduce, by the processor, a navigation distance between the objects based on the transition probability matrix. The design perturbation preference can define a permissible degree of change from the initial design layout. Also, the altering can comprise the reducing the navigation distance in accordance with the design perturbation preference. An advantage of such a computer program product can be customizing the user interface while accounting for a user's resistance to change from the initial design layout.

DETAILED DESCRIPTION

Figure 1:
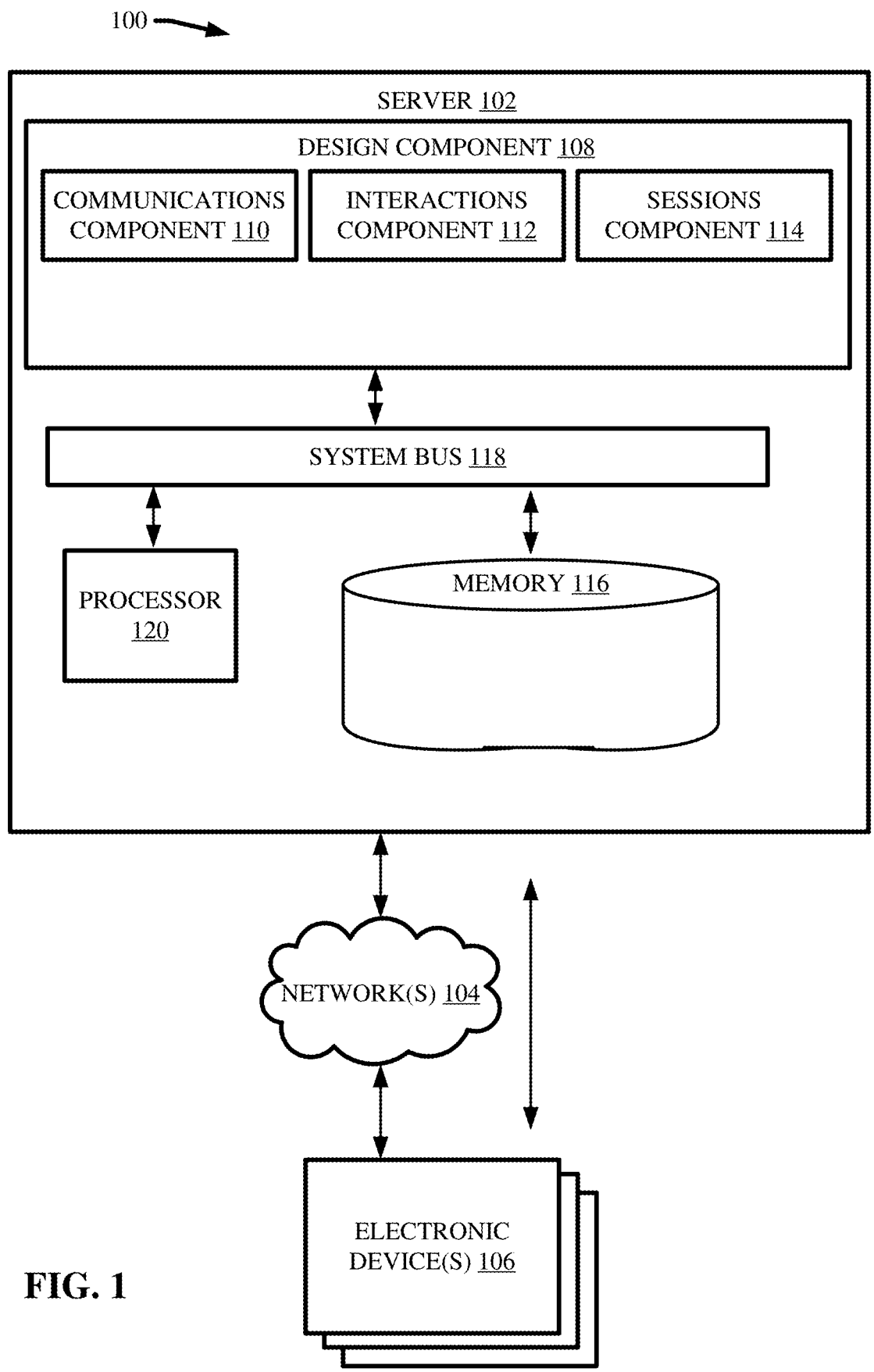
FIG. 1 illustrates a block diagram of an example, non-limiting system that can analyze one or more interactions with one or more user interfaces for application software in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with conventional implementations of design layout customization; the present disclosure can be implemented to produce a solution to one or more of these problems by personalizing the design layout of a user interface for application software while accounting for a user's resistance to design perturbations. Advantageously, one or more embodiments described herein can determine a balance between design layout personalization and design layout consistency. By accounting for a user's resistance to design perturbations, various embodiments described herein can optimize the positioning of one or more objects within the design layout so as to minimize that amount of user interface navigation experienced by the user.

Various embodiments of the present invention can be directed to computer processing systems, computer-implemented methods, apparatus and/or computer program products that facilitate the efficient, effective, and autonomous (e.g., without direct human guidance) generation of one or more design layouts for one or more user interfaces of application software based on interactions with the user interface while accounting for one or more design perturbation preferences. In one or more embodiments, the one or more design layouts can be generated based a user's past interactions with the user interface to engage and/or view one or more objects of the application software. Further, in various embodiments the one or more design perturbation preferences can define a minimalization of design perturbation and/or maintaining an amount of design perturbation below a user defined threshold.

The computer processing systems, computer-implemented methods, apparatus and/or computer program products employ hardware and/or software to solve problems that are highly technical in nature (e.g., optimization of user interface design layout), that are not abstract and cannot be performed as a set of mental acts by a human. An individual, or a plurality of individuals, cannot readily analyze user interactions via a user interface with the same speed and/or efficiency as the embodiments described herein. Additionally, an individual cannot determine the probability of a user transitioning from one object to another with the level of accuracy, precision, and/or efficiency achieved by the computer generated matrices utilized in one or more embodiments described herein. Further, the autonomous nature of one or more embodiments described herein can maintain the confidentiality of a user's operational history of the application software.

FIG. 1 illustrates a block diagram of an example, non-limiting system 100 that can generate one or more design layouts for one or more user interfaces of application software based on interactions with the user interface while accounting for one or more design perturbation preferences in accordance with one or more embodiments described herein. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more electronic devices 106. The server 102 can comprise design component 108. The design component 108 can further comprise communications component 110, interactions component 112, and/or sessions component 114. Also, the server 102 can comprise or otherwise be associated with at least one memory 116. The server 102 can further comprise a system bus 118 that can couple to various components such as, but not limited to, the design component 108 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more electronic devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the design component 108 can be provided on the one or more servers 102, it should be appreciated that the architecture of system 100 is not so limited. For example, the design component 108, or one or more components of design component 108, can be located at another computer device, such as another server device, a client device, etc.

The one or more electronic devices 106 can comprise one or more computerized devices, which can include, but are not limited to: personal computers, desktop computers, laptop computers, cellular telephones (e.g., smartphones), computerized tablets (e.g., comprising a processor), smartwatches, keyboards, touch screens, a combination thereof, and/or the like. Additionally, the one or more electronic devices 106 can comprise one or more displays. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like. A user of the system 100 can utilize the one or more electronic devices 106 to interact with one or more user interfaces of an application software.

In various embodiments, the application software can operate on the one or more electronic devices 106 and can comprise one or more computer programs that can perform coordinated functions, tasks, activities, and/or the like in accordance with a user's instructions. An application software user can command and/or manipulate the application software via one or more user interfaces. In one or more embodiments, the one or more user interfaces can comprise one or more application objects arranged in accordance with a design layout. For example, the design layout can delineate an order and/or location in which the application objects are positioned within the user interface. Additionally, the design layout can delineate how application objects are comprised within a user interface (e.g., the size, appearance, and/or function of the application objects). The application software user can navigate the one or more user interfaces to interact with the one or more application objects and thereby facilitate commanding and/or manipulating the application software. For example, the one or more application objects can include, but are not limited to: text (e.g., headings, titles, descriptions, a combination thereof, and/or like), images (e.g., photos, caricatures, thumbnails, displays of art, portraits, landscapes, a combination thereof, and/or the like), electronic buttons and/or tabs, sections of the one or more design layouts, a composition thereof, a combination thereof, and/or the like.

The one or more electronic devices 106 can display the one or more user interfaces to a user of the application software. Additionally, the one or more electronic devices 106 can provide one or more controls that can enable the user to navigate the one or more user interfaces and/or interact with the one or more application objects. Example controls can include, but are not limited to: buttons, tabs, touch screens, keyboards, a computer mouse, a combination thereof, and/or the like. The one or more electronic devices 106 can be operably coupled to the one or more servers 102 via a direct electrical connection and/or the one or more networks 104. Further, the communications component 110 can facilitate communications (e.g., the sharing of data) between the design component 108 (e.g., including the associate components of the design component 108) and the or more electronic devices 106.

In various embodiments, the interactions component 112 can collect interactions data from the one or more electronic devices 106 regarding a user's past or present interactions with the one or more user interfaces of an application software. The interactions data can comprise explicit and/or implicit interactions with the user interface performed by the subject user. Example explicit interactions can include the active engagement (e.g., selection) of one or more application objects. Example implicit interactions can include the prolonged display of one or more application objects (e.g., an implicit interaction can be delineated by the display of one or more application objects by the one or more electronic devices 106 for a period of time greater than or equal to a define threshold). The interactions data can include data regarding, for example but not limited to, one or more of the following features regarding application objects interacted with via the user interface: identification data regarding the application objects, characteristic data regarding the application objects (e.g., data regarding an application object's type, size, appearance, function, a combination thereof, and/or the like), position data regarding where and/or how the application objects are comprised within the design layout, engagement data regarding the application objects (e.g., which application objects were explicating interacted with, which application objects were implicitly interacted with, a time at which application objects were interacted with, the order in which application objects were interacted with, how application objects were interacted with, a combination thereof, and/or the like), a combination thereof, and/or the like.

In one or more embodiments, the interactions component 112 can monitor the one or more electronic devices 106 to track user operations and collect the interactions data. In some embodiments, the one or more electronic devices 106 can track user operations and/or collect interactions data, wherein the interactions component 112 can retrieve the interaction data from the one or more electronic devices 106. For example, the interactions component 112 can retrieve interactions data from the one or more electronic devices 106 periodically in accordance with one or more set time intervals and/or in response to one or more defined events (e.g., in response to a closing of the application software). Further, while FIG. 1 depicts the interactions component 112 as located on the server 102, the architecture of the system 100 is not so limited. For example, the interactions component 112 can be located on the one or more electronic devices 106 and/or can communicate (e.g., share interactions data) with various components of the server 102 via the one or more networks 104 and/or communications component 110.

In one or more embodiments, the sessions component 114 can analyze the interactions data to determine session data that can characterize a sequence in which a user of the application software interacted with the application objects. The sessions data can comprise one or more sessions of operability performed by a subject user of the application software. A session can be defined by one or more triggering events and/or termination events. Example triggering events can include, but are not limited to: engaging the application software, initializing the application software, logging into an account associated with the application software, a combination thereof, and/or the like. Example termination events can include, but are not limited to: disengaging the application software, terminating the application software, turning off the application software, logging off an account associated with the application software, a combination thereof, and/or the like. The one or more sessions can comprise a sequence of application objects arranged in an order in which the application objects were interacted with by the subject user during a period of time defined by a triggering event and/or termination event. For example, the session data can comprise one or more sessions associated with a subject user of the application software, wherein each session can comprise a sequence of interactions with one or more application objects performed by the user via the one or more user interfaces.

Figure 2:
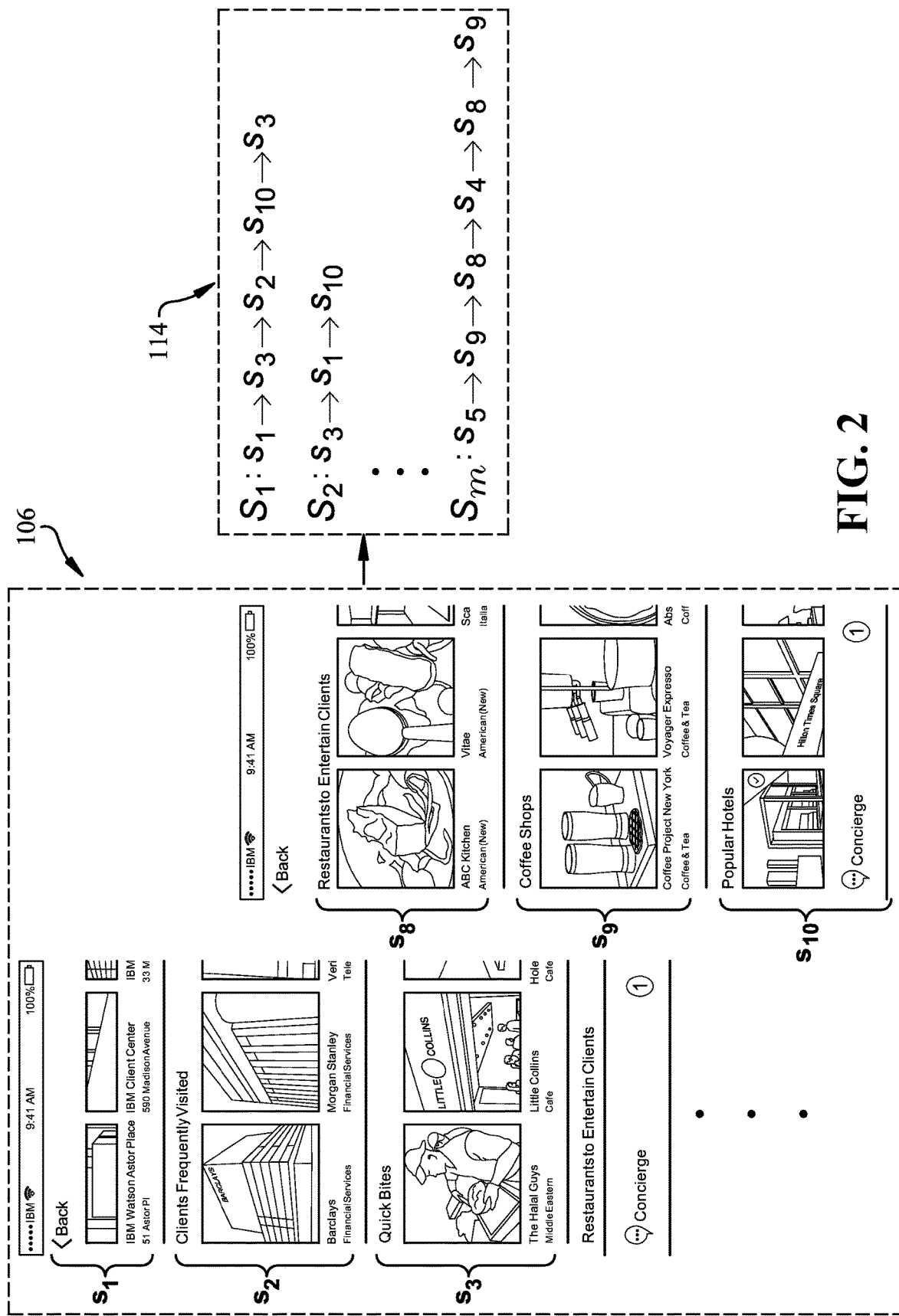
FIG. 2 illustrates a diagram of example, non-limiting session data that can be determined by one or more systems based on one or more interactions with one or more user interfaces for application software in accordance with one or more embodiments described herein.

FIG. 2 illustrates a diagram of example, non-limiting session data that can be determined by the sessions component 114 based on interaction data in accordance with one or more embodiments described herein. Repetitive description of like elements employed in other embodiments described herein is omitted for sake of brevity.

As shown in FIG. 2, the one or more electronic devices 106 can display one or more user interfaces. For example, the one or more electronic devices 106 can be smartphones (e.g., as depicted in FIG. 2). Further, FIG. 2 depicts an instance in which the one or more user interfaces extend beyond the initial display of the one or more electronic devices 106, and a user of the application software could scroll down the display to view subsequent portions of the user interface (e.g., as indicated by the three bold dots depicted in FIG. 2). In the exemplary user interface depicted in FIG. 2, the design layout comprises a plurality of application objects composed as sequential sections of the user interface. For example, FIG. 2 delineates a first section as "$S_1$", a second section as "$S_2$", a third section as "$S_3$", an eighth section as "$S_8$", a ninth section as "$S_9$", and/or a tenth section as "$S_{10}$". Further, sections four through seven can be located at portions of the user interface positioned between the moments of display depicted in FIG. 2 (e.g., in portions of the user interface represented by the three bold dots). Additionally, the exemplary sections can depict titles, images, and/or descriptions.

A user of the application software can interact with the exemplary user interface, for example, by: navigating the design layout, selecting one or more sections, viewing one or more sections, transitioning from one section to another, a combination thereof, and/or the like. The application software user's interactions with the user interface can be captured by interaction data via the one or more interactions components 112. Further, the one or more sessions component 114 can analyze the interactions data to determine session data that can characterize a usage pattern of the subject user.

FIG. 2 depicts exemplary session data that can be derived from a user's interactions with the exemplary user interface. The exemplary session data can comprise a plurality of sessions (e.g., delineated by "$S_1$", "$S_2$", and "$S_m$"). Further, each exemplary session can comprise an order in which the sections of the user interface were interacted with by the subject user during the subject session. For instance, during the first session (e.g., represented by "$S_1$", the application software user interacted with the first section "$s_1$" of the design layout, then the third section "$s_3$" of the design layout, then the second section "$s_2$" of the design layout", then the tenth section "$s_{10}$" of the design layout, followed by the third section "$s_3$" again. As shown in FIG. 2, the sessions component 114 can determine session data that characterizes a usage pattern performed by the application software user with regards to the subject user interface.

Figure 3:
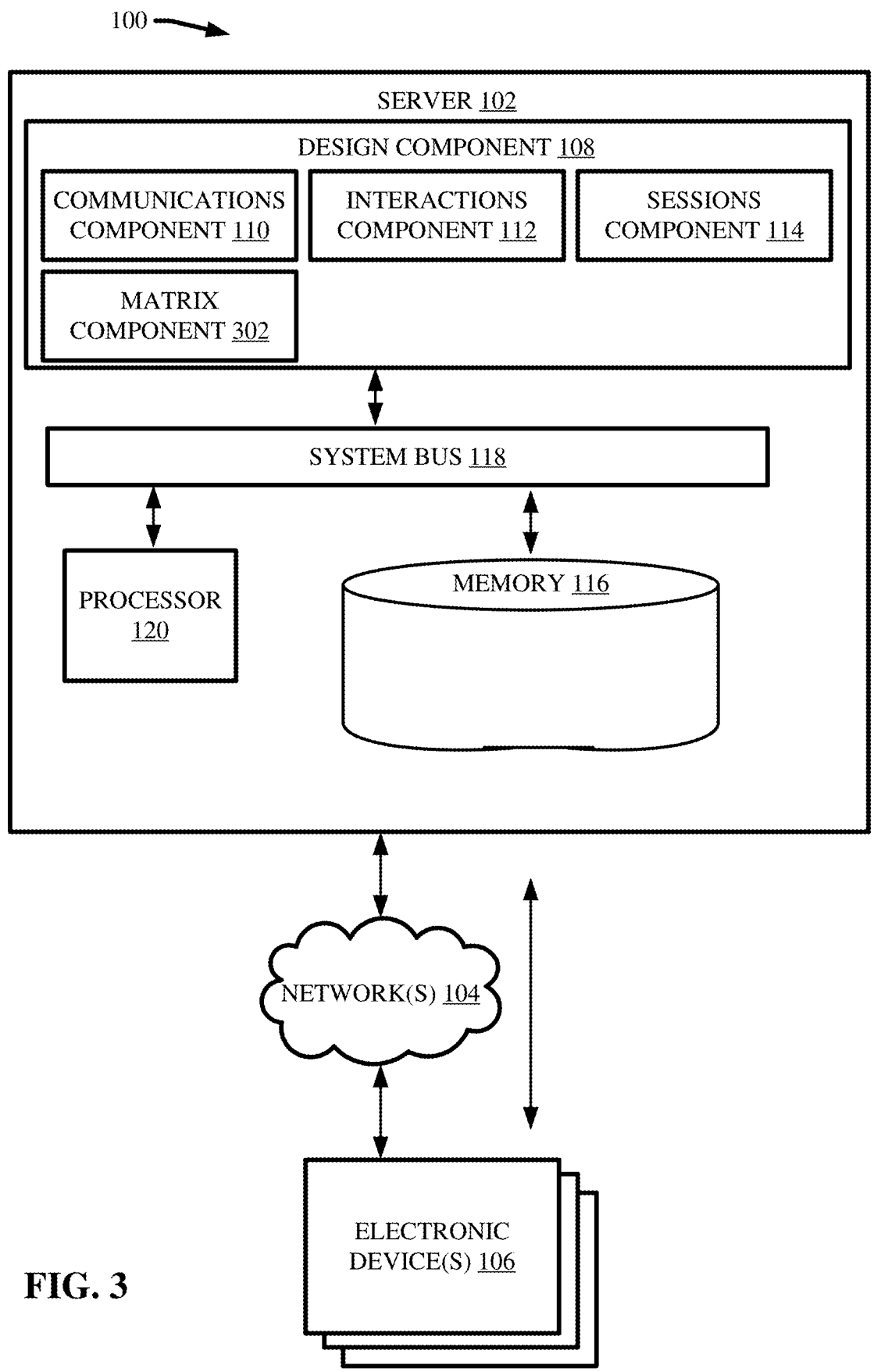
FIG. 3 illustrates a block diagram of an example, non-limiting system that can determine the probability of a user transitioning from one object of an initial design layout to another object of the initial design layout based on past interactions with a user interface in accordance with one or more embodiments described herein.

FIG. 3 illustrates a diagram of the example, non-limiting system 100 further comprising matrix component 302 in accordance with one or more embodiments described herein. Repetitive description of like elements employed in other embodiments described herein is omitted for sake of brevity. In various embodiments, the matrix component 302 can determine a probability that the application software user will transition from one application object to another based on the session data.

For example, the matrix component 302 can estimate a probability that a user of the application software will navigate from a first application object to a second application object based on the usage pattern (e.g., as depicted by the session data) of the user. In one or more embodiments, the matrix component 302 can generate graph structure data to determine the probability of a user's interaction from the first application object to the second application object. For example, the graph structure data can comprise one or more vertices (e.g., nodes representing the application objects) and/or edges (e.g., representing the transitions between application objects). In one or more embodiments, the matrix component 302 can generate one or more transition probability matrices to determine the probability of a user's interaction from the first application object to the second application object. Further, the matrix component 302 can generate the one or more transition probability matrices based on a count of transitions between the application objects and/or a weighted approach that can afford different types of interactions more or less influence on a subject probability. For example, explicit interactions can be given greater mathematical weight than implicit interactions, or vise versa. In various embodiments, the matrix component 302 can determine the probability of the user transitioning from the first application object to the second application object based on a plurality of sessions comprised within the session data.

Further, in one or more embodiments the matrix component 302 can generate the one or more transition probability matrices such that only probabilities equal to or larger than a defined threshold can populate the matrices. For example, probability values less than the defined threshold can be indicative of outliers in the session data that can characterize unintentional interactions by the user. By comparing the probability values to the defined threshold during generation of the one or more transition probability matrices, the matrix component 302 can prevent a user's unintended and/or infrequent interactions with the one or more user interfaces from contributing to the personalization of the one or more design layouts.

Figure 4:
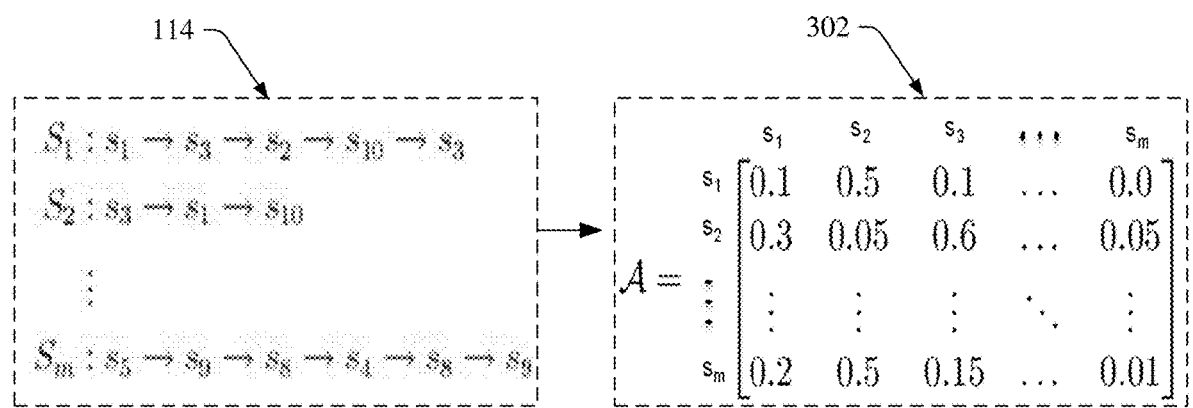
FIG. 4 illustrates a diagram of an example, non-limiting transition probability matrix that can be generated by one or more systems to facilitate determining the probability of a user transitioning from one object of an initial design layout to another object of the initial design layout based on past interactions with a user interface in accordance with one or more embodiments described herein.

FIG. 4 illustrates a diagram of an example, non-limiting transition probability matrix that can be generated by the one or more matrix components 302 in accordance with one or more embodiments described herein. Repetitive description of like elements employed in other embodiments described herein is omitted for sake of brevity. The exemplary transition probability matrix depicted in FIG. 4 can be generated based on the exemplary session data previously depicted in FIG. 2.

As shown in FIG. 4, each axis of the exemplary transition probability matrix can regard one or more application objects, such as the exemplary sections from the exemplary user interface depicted in FIG. 2. Further, each entry of the exemplary transition probability matrix can depict the probability of the subject user transitioning from a first application object (e.g., delineated by a first axis of the matrix) to a second application object (e.g., delineated by another axis of the matrix).

Figure 5:
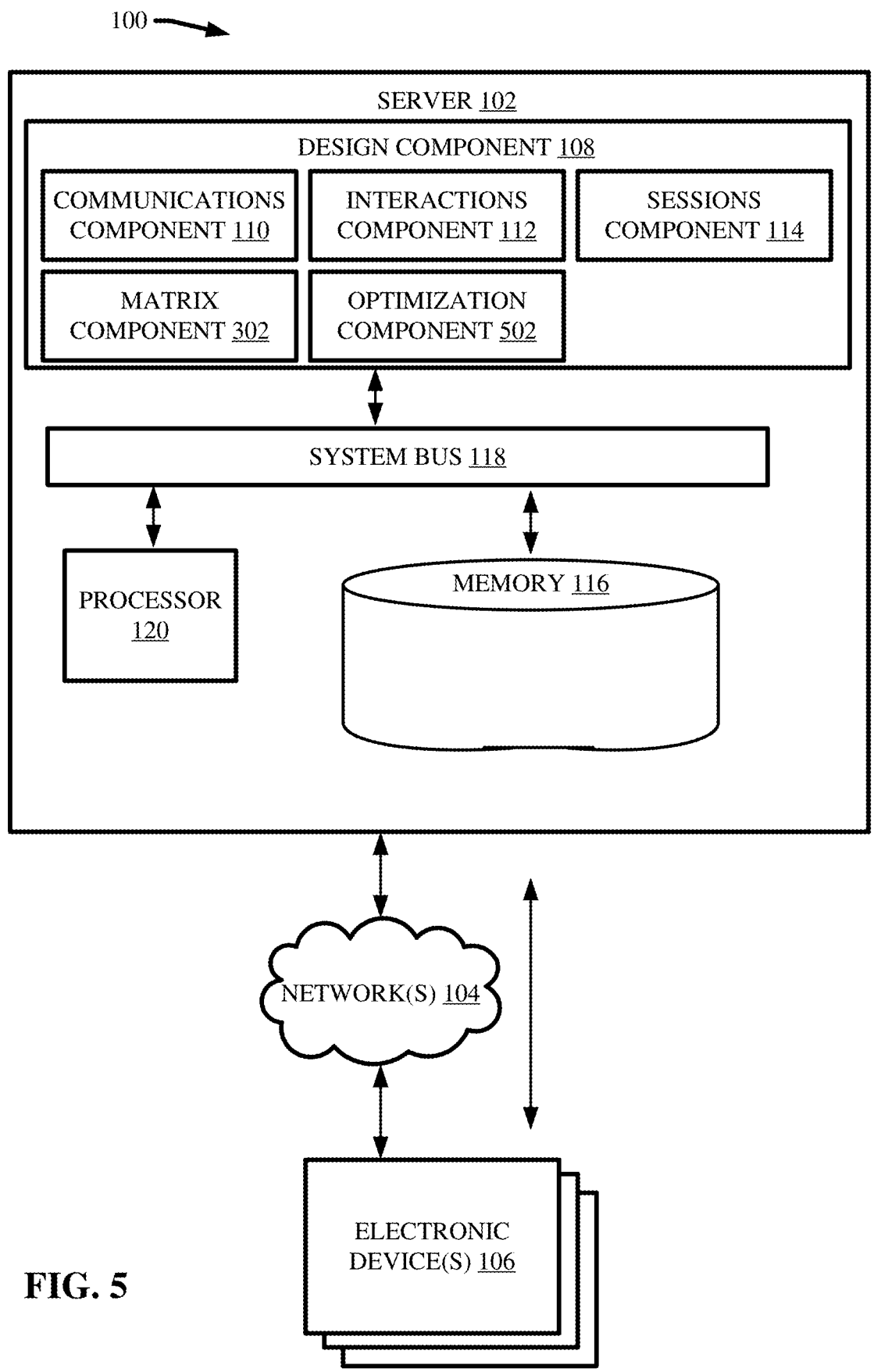
FIG. 5 illustrates a block diagram of an example, non-limiting system that can adjust one or more initial design layouts of a user interface for application software to minimize an expected navigation distance between objects from the one or more initial design layouts in accordance with one or more embodiments described herein.

FIG. 5 illustrates a diagram of the example, non-limiting system 100 further comprising optimization component 502 in accordance with one or more embodiments described herein. Repetitive description of like elements employed in other embodiments described herein is omitted for sake of brevity. In various embodiments, the optimization component 502 can determine a personalized design layout based on the interactions data and one or more design perturbation preferences.

For example, the optimization component 502 can determine the personalized design layout based on the one or more probabilities determined by the matrix component 302. For instance, the optimization component 502 can analyze the one or more transition probability matrices to determine a navigation distance expected to be traversed by the subject user while interacting the one or more user interfaces. The navigation distance can be a mathematically valid distance between the application objects. For example, the navigation distance can be a physical distance between a first application object and a second application object on a display of the one or more electronic devices 106 that presents the initial design layout.

In one or more embodiments, the optimization component 502 can determine the personalized design layout by adjusting the composition of the initial design layout to reduce the navigation distance between particular application objects, thereby also reducing the expected navigation distance experienced by the user. For example, the optimization component 502 can reduce the navigation distance between the first and second application objects based on the probability that the subject user will transition between the first and second application objects.

Further, the optimization component 502 can reduce the navigation distance between application objects while accounting for one or more design perturbation preferences. The one or more design perturbation preferences can regard a degree of change from the initial design layout to generate the personalized design layout. In one or more embodiments, the design perturbation preference can be to minimize the amount of design perturbation between the initial design layout and the personalized design layout. In some embodiments, the design perturbation preference can be defined by the user's preference. For example, in one or more embodiments, the application software user can define a permissible degree of change from the initial design layout that can be implemented by the optimization component 502 in determining the composition of the personalized design layout.

For example, in one or more embodiments the optimization component 502 can determine the personalized design layout in accordance with the mathematical relationships depicted in Equation 1 below.

$$\text{Minimize} \sum_{i,j} \frac{a_{i,j}}{n(n-1)}(r_i - r_j)^2 + \lambda \sum_i \frac{1}{n}(r_i - \bar{r}_i)^2 \quad (1)$$

$$\text{Subject to: } 1 \leq r_i \leq n, r_i \in N,$$

$$r_i \neq r_j$$

Wherein the term $$"\sum_{i,j} \frac{a_{i,j}}{n(n-1)}(r_i - r_j)^2"$$

can represent the expected navigation distance between a first application object (e.g., represented by "i") and a second application object (e.g., represented by "j"), the term $$"\sum_i \frac{1}{n}(r_i - \bar{r}_i)^2"$$

can represent the design perturbation between the personalized layout design and the initial layout design, and "$\lambda$" can be a parameter to adjust the degree of design changes (e.g., the weight of the design perturbation can be defined by "$\lambda$"). Further, "n" can represent the number of application objects comprised within the initial design layout, "$a_{i,j}$" can represent a probability of the user transitioning between the first and second application objects (e.g., as determine by the one or more transition probability matrices), "$r_i$" can represent the positioning of the first application object in the personalized design layout, "$r_j$" can represent the positioning of the second application object in the personalized design layout, and/or "$\bar{r}_i$" can represent the positioning of the first application object in the initial design layout.

In one or more embodiments, the application software user can define the amount of weight attributed to the design perturbation by setting the value of the "$\lambda$" parameter. Increasing the value of "$\lambda$" can afford more mathematical weight towards reducing design perturbations, while decreasing the value of "$\lambda$" can afford more mathematical weight towards reducing the expected navigation distance. For example, as the value of "$\lambda$" approaches 1, the amount of design perturbation between the personalized design layout and the initial design layout can decrease. Thereby, a user who prefers less design change can increase the value of "$\lambda$" to decrease the amount of personalization in the personalized design layout and increase the amount of design consistency (e.g., as compared to the initial design layout). In contrast, a user who prioritizes personalization over design consistency can decrease the value of "$\lambda$", thereby increasing the weight of the expected navigation distance in the mathematical relationship between reducing navigation distance and preserving design consistency. In various embodiments, the optimization component 502 can minimize the expected navigation distance to an extent permissible by the design perturbation preference, as delineated by the amount of weight assigned to the design perturbation. Advantageously, the application software user can define one or more design perturbation preferences regarding a permissible amount of deviation from the initial design layout by adjusting the "$\lambda$" parameter, thereby customizing a balance between personalization and design layout consistency.

In one or more embodiments, the optimization component 502 can minimize the expected navigation distance and the design perturbations in consideration of each other. For example, the optimization component 502 can determine a personalized design layout that achieves the minimal amount of expected navigation distance while necessitating the least amount of adjustment to the initial design layout to generate the personalized layout design. By minimizing the expected navigation distance in consideration of minimizing the design perturbations, the optimization component 502 can advantageously determine a personalized design layout that can be adapted to a use pattern while enabling the application software to leverage past experience with the initial design layout to facilitate navigation of the personalized design layout.

In various embodiments, the design component 108 can generate one or more personalized layout designs based on the determinations of the optimization component 502. For example, the design component 108 can generate the one or more personalized layout designs by adjusting the one or more initial design layouts in accordance with the application object positioning determined by the optimization component 502 to achieve a reduction in the navigation distance in consideration of the one or more design perturbation preferences. Further, the design component 108 can share the one or more personalized design layouts with the one or more electronic devices 106 for presentation to the application software user via a direct electrical connection and/or the one or more networks 104.

Figure 6:
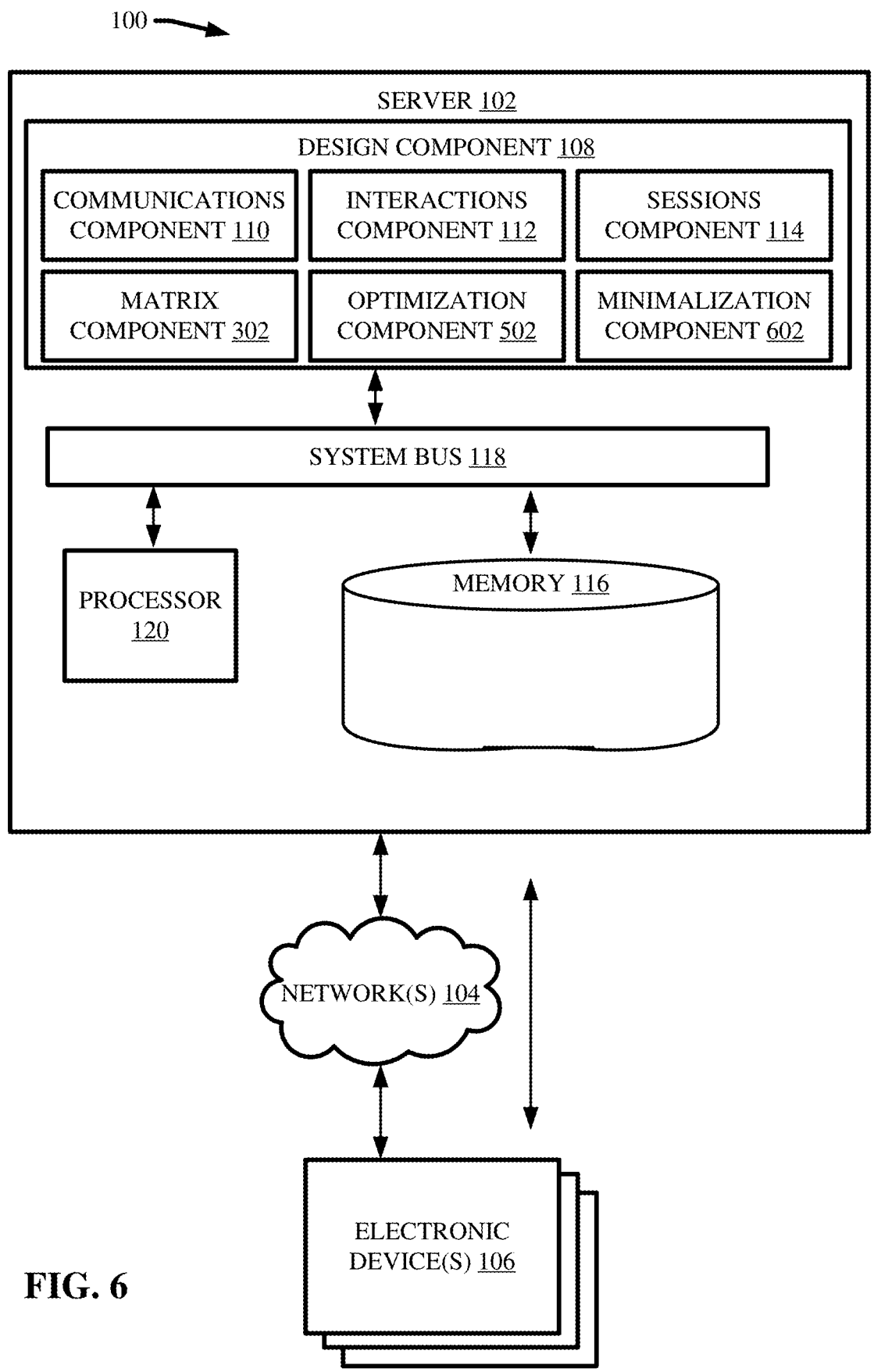
FIG. 6 illustrates a block diagram of an example, non-limiting system that can personalize one or more design layouts of a user interface for application software while meeting one or more user preferences with regards to design perturbation in accordance with one or more embodiments described herein.

FIG. 6 illustrates a diagram of the example, non-limiting system 100 further comprising minimalization component 602 in accordance with one or more embodiments described herein. Repetitive description of like elements employed in other embodiments described herein is omitted for sake of brevity. In various embodiments, the minimalization component 602 can determine a value for the "$\lambda$" parameter that can result in the minimal amount of design perturbation that achieves the minimal navigation distance experienced by the application software user.

For example, the minimalization component 602 and the optimization component 502 can function in a feedback loop to learn a value of "$\lambda$" that efficiently facilitates minimalization of both the expected navigation distance and the design perturbation to further improve operability of the application software. For instance, the minimalization component 602 can initially set "$\lambda$" to a value slightly smaller than 1 (e.g., 0.99); whereupon the optimization component 502 can determine a first iteration of the personalized design layout in accordance with Equation 1 based on the initial "$\lambda$" value (e.g., 0.99). Thereby, the first iteration of the personalized design layout can exhibit minimal deviation from the initial design layout. The first iteration of the personalized design layout can be generated by the design component 108 and/or shared with the electronic devices 106, whereupon a user can interact with the first iteration of the personalized design layout and iteration data can be collected by the interactions component 112 and/or analyzed by the sessions component 114 as described herein. Further, the minimalization component 602 can analyze the session data regarding the first iteration of the personalized design layout to identify a trend of navigation distance traversed by the user.

Wherein the trend of navigation traversed by the user indicates that the user experienced less navigation distance when interacting with the first iteration of the personalized design layout than the amount of navigation distance experienced when interacting with the initial design layout, the minimalization component 602 can initialize a second iteration of the feedback loop. In the second iteration, the minimalization component 602 can further reduce "$\lambda$" to a value less than the value utilized in the first iteration (e.g., a value less than 0.99), whereupon the optimization component 502 can determine a second iteration of the personalized design layout in accordance with Equation 1 based on the reduced "$\lambda$" value. Thereby, the second iteration of the personalized design layout can exhibit more deviation from the initial design layout than the first iteration of the personalized design layout. The second iteration of the personalized design layout can be generated by the design component 108 and/or shared with the electronic devices 106, whereupon a user can interact with the second iteration of the personalized design layout and iteration data can be collected by the iteration component 112 and/or analyzed by the sessions component 114 as described herein. Further, the minimalization component 602 can analyze the session data regarding the second iteration of the personalized design layout to identify whether the navigation distance traversed by the user continued to decrease (e.g., whether the user experienced less navigation distance while interacting with the second iteration of the personalized device layout as compared to the first iteration of the personalized device layout).

In response to the minimalization component 602 determining that the navigation distance experienced by the user increased from the first iteration of the personalized design layout to the second iteration of the personalized design layout, the design component 108 can re-generate the first iteration of the personalized design layout using the initial "$\lambda$" value for use on the one or more electronic devices 106. In response to the minimalization component 602 determining that the navigation distance experienced by the user decreased from the first iteration of the personalized design layout to the second iteration of the personalized design layout, the design component 108 can initialize an additional iteration of the feedback loop. In the additional iteration, the minimalization component 602 can reduce "$\lambda$" even further to a value less than the values utilized in previous iterations (e.g., less than the value utilized in the first iteration and less than the value utilized in the second iteration). In response, the optimization component 502 can determine an additional iteration of the personalization design layout, the design component 108 can generate the additional iteration of the personalized design layout, and the minimalization component 602 can determine whether the trend of navigation distance experienced by the user continues to decrease.

Thereby, the minimalization component 602 can continue to initialize additional iterations of the feedback loop until the trend of navigation distance experienced by the user increases, at which point the minimalization component 602 can terminate the feedback loop and the design component 108 can generate the iteration of the personalized design layout last associated with a decrease in the navigation distance trend. For example, the amount of personalization can reach a level in which navigation distance experienced by the user can increase despite a reduction in the expected navigation distance due to the user's unfamiliarity with the composition of the personalized device layout. In other words, the amount of design perturbation implemented to achieve the subject amount of personalization can result in the user being lost in the design layout, and thereby traversing an unnecessary navigation distance to interact with desired application objects. Advantageously, the minimalization component 602 can determine an appropriate amount of weight to afford the design perturbations in order minimize the amount of user interface navigation experienced by the application software user.

Figure 7:
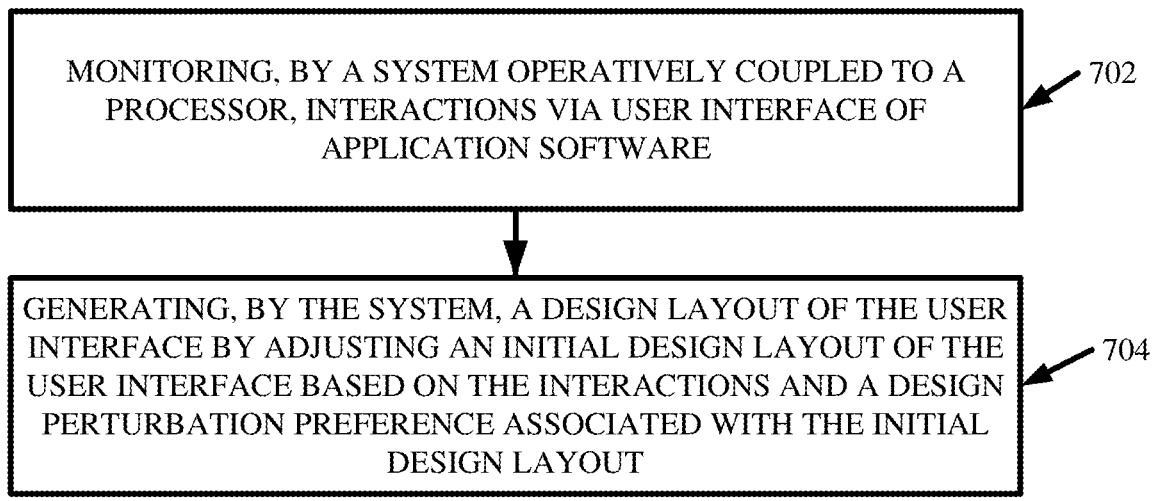
FIG. 7 illustrates a flow diagram of an example, non-limiting method that can facilitate autonomous personalization of one or more design layouts of a user interface for application software while meeting one or more user preferences with regards to design perturbation in accordance with one or more embodiments described herein.

FIG. 7 illustrates a flow diagram of an example, non-limiting method 700 that can facilitate personalizing one or more design layouts for one or more application software user interfaces in accordance with one or more embodiments described herein. Repetitive description of like elements employed in other embodiments described herein is omitted for sake of brevity.

At 702, the method 700 can comprise monitoring (e.g., via the interactions component 112 and/or the sessions component 114), by a system 100 operatively coupled to a processor 120, interactions via one or more user interfaces of application software. The one or more interactions can comprise explicit interactions and/or implicit interactions with one or more application objects of the application software. For example, the monitoring at 702 can comprise collecting (e.g., via the interactions component 112) interaction data in accordance with one or more embodiments described herein. Further, the monitoring at 702 can comprise determining (e.g., via the sessions component 114) session data based on the interaction data, wherein the session data can characterize a sequence in which the application objects were interacted with by a user of the application software.

At 704, the method 700 can comprise generating (e.g., via the design component 108), by the system 100, one or more design layouts (e.g., personalized design layouts) of the one or more user interfaces by adjusting one or more initial design layouts of the one or more user interfaces based on the interactions monitored at 702 and/or one or more design perturbation preferences associated with the initial design layout. The one or more design perturbation preferences can delineate a degree of deviation from the one or more initial design layouts permissible during the generating at 704. For example, the generating at 704 can comprise reducing (e.g., via the optimization component 502) an expected amount of navigation distance between application objects in consideration of the one or more design perturbation preferences, as described herein with regards to one or more embodiments. For instance, the generating at 704 can comprise determining the composition of the one or more design layouts in accordance with the one or more mathematical relationships depicted in Equation 1.

Figure 8:
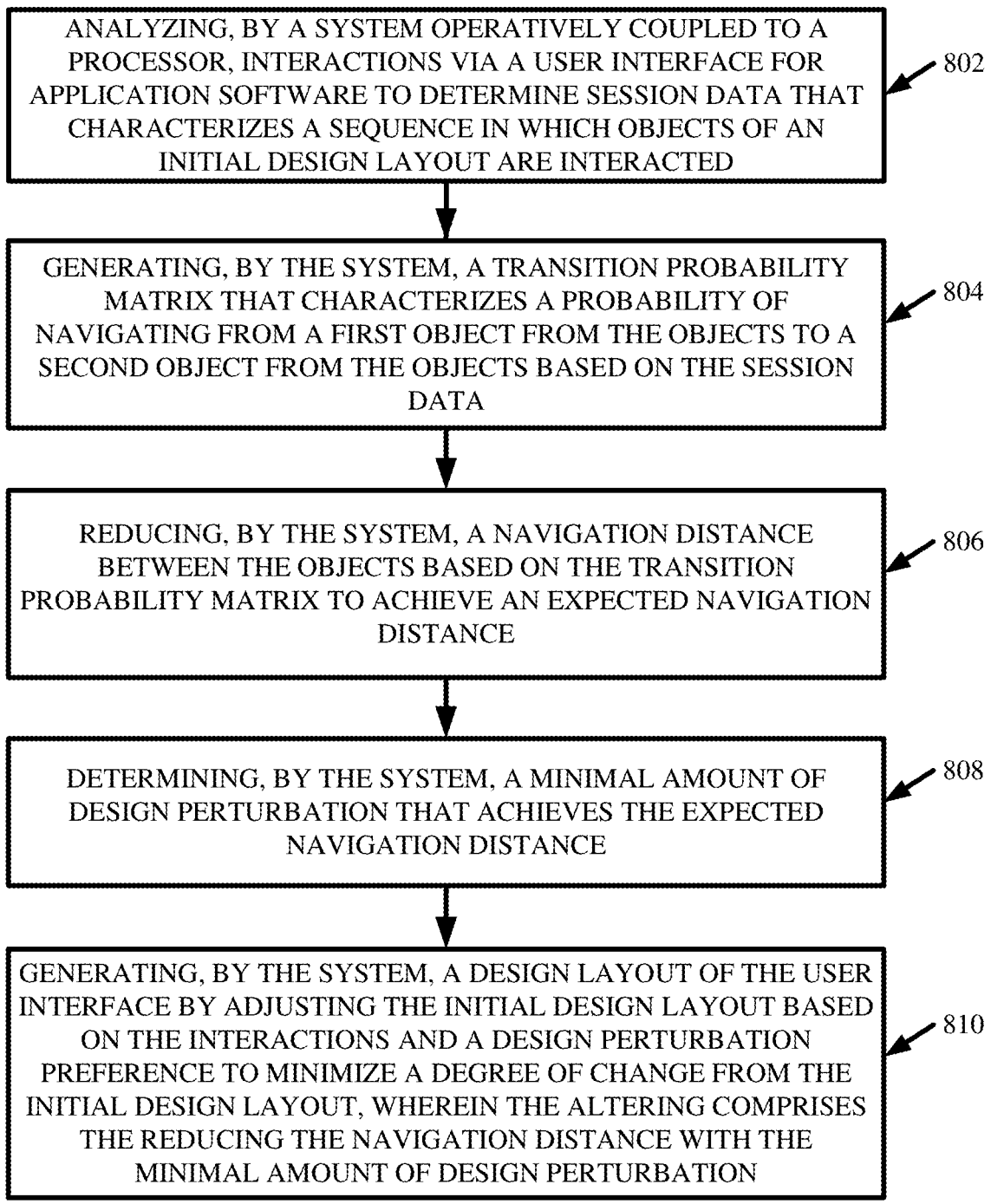
FIG. 8 illustrates a flow diagram of an example, non-limiting method that can facilitate autonomous personalization of one or more design layouts of a user interface for application software while meeting one or more user preferences with regards to design perturbation in accordance with one or more embodiments described herein.

FIG. 8 illustrates a flow diagram of an example, non-limiting method 800 that can facilitate personalizing one or more design layouts for one or more application software user interfaces in accordance with one or more embodiments described herein. Repetitive description of like elements employed in other embodiments described herein is omitted for sake of brevity.

At 802, the method 800 can comprise analyzing (e.g., via the interactions component 112 and/or the sessions component 114), by a system 100 operatively coupled to a processor 120, one or more interactions via one or more user interfaces for application software to determine session data that can characterize one or more sequences in which objects (e.g., application objects) of one or more initial design layouts are interacted. The one or more interactions can comprise explicit interactions and/or implicit interactions with one or more application objects of the application software. For example, the analyzing at 802 can comprise collecting (e.g., via the interactions component 112) interaction data in accordance with one or more embodiments described herein. As exemplified by the exemplary session data depicted in FIG. 2, the session data determined at 802 can comprise a plurality of sessions regarding a user's interaction with the one or more user interfaces.

At 804, the method 800 can comprise generating (e.g., via the matrix component 302), by the system 100, one or more transition probability matrices that can characterize a probability of navigating from one or more first objects from the objects of 802 to one or more second objects from the objects of 802 based on the session data. As exemplified by the exemplary transition probability matrix depicted in FIG. 4, the one or more transition probability matrices generated at 804 can regard a plurality of sessions comprised within the session data and/or can determine the probability of interaction sequences not explicitly included within the interactions and/or session data.

At 806, the method 800 can comprise reducing (e.g., via the optimization component 502), by the system 100, one or more navigation distances between the objects based on the one or more transition probability matrices to achieve one or more expected navigation distances. For example, the reducing at 806 can be performed in accordance with one or more of the mathematical relationships depicted in Equation 1. For instances, the navigation distance between the one or more first objects and the one or more second objects can be reduced based on the probability of the user transitioning from the one or more first objects to the one or more second objects, as determined by the one or more transition possibility matrices. In one or more embodiments, the navigation distance can be expressed as a mathematically valid distance between the objects (e.g., a physical distance between the one or more first objects and the one or more second objects on a display presenting the initial design layout).

At 808, the method 800 can comprise determining (e.g., via the optimization component 502), by the system 100, a minimal amount of design perturbation that can achieve the one or more expected navigation distances. For example, the determining at 808 can comprise analyzing the composition of the objects in the initial design layout in view of the one or more mathematical relationships depicted in Equation 1 to determine the minimal amount of deviation from the one or more initial design layouts that can achieve the one or more expected navigation distances.

At 810, the method 800 can comprise generating (e.g., via the design component 108), by the system 100, one or more design layouts (e.g., personalized design layouts) of the one or more user interfaces by adjusting the one or more initial design layouts based on the interactions and one or more design perturbation preferences to minimize a degree of change from the one or more initial design layouts. The altering at 810 can comprise reducing the navigation distance in accordance with 806 along with implementing the minimal amount of design perturbation determined at 808. Advantageously, method 800 can generate one or more design layouts while balancing personalization and design perturbation to reduce the amount of user interface navigation experienced by a user of the application software and thereby improve operability of the application software.

Figure 9:
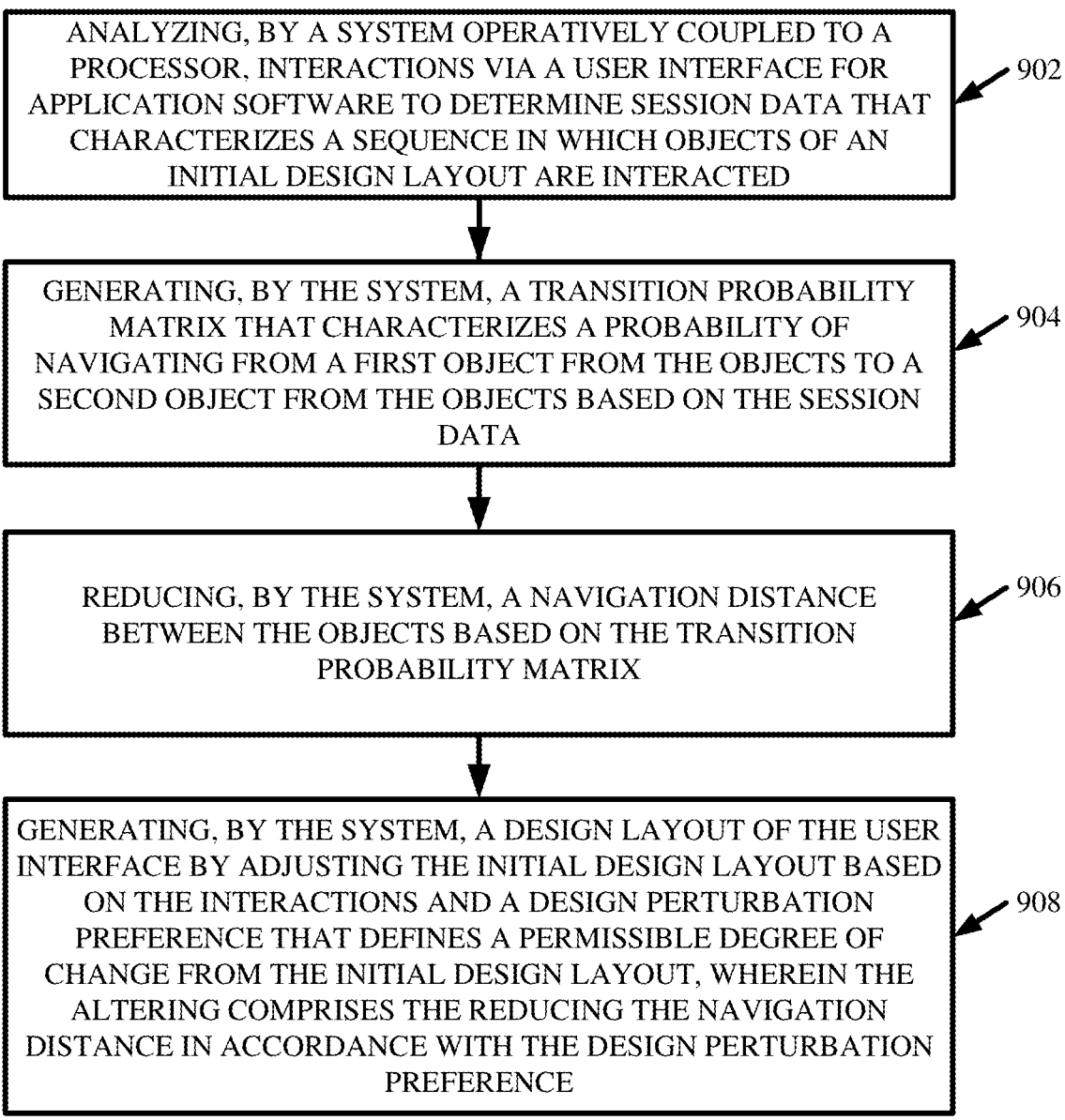
FIG. 9 illustrates a flow diagram of an example, non-limiting method that can facilitate autonomous personalization of one or more design layouts of a user interface for application software while meeting one or more user preferences with regards to design perturbation in accordance with one or more embodiments described herein.

FIG. 9 illustrates a flow diagram of an example, non-limiting method 900 that can facilitate personalizing one or more design layouts for one or more application software user interfaces in accordance with one or more embodiments described herein. Repetitive description of like elements employed in other embodiments described herein is omitted for sake of brevity.

At 902, the method 900 can comprise analyzing (e.g., via the interactions component 112 and/or the sessions component 114), by a system 100 operatively coupled to a processor 120, one or more interactions via one or more user interfaces for application software to determine session data that can characterize one or more sequences in which objects (e.g., application objects) of one or more initial design layouts are interacted. The one or more interactions can comprise explicit interactions and/or implicit interactions with one or more application objects of the application software. For example, the analyzing at 902 can comprise collecting (e.g., via the interactions component 112) interaction data in accordance with one or more embodiments described herein. As exemplified by the exemplary session data depicted in FIG. 2, the session data determined at 902 can comprise a plurality of sessions regarding a user's interaction with the one or more user interfaces.

At 904, the method 900 can comprise generating (e.g., via the matrix component 302), by the system 100, one or more transition probability matrices that can characterize a probability of navigating from one or more first objects from the objects of 902 to one or more second objects from the objects of 902 based on the session data. As exemplified by the exemplary transition probability matrix depicted in FIG. 4, the one or more transition probability matrices generated at 904 can regard a plurality of sessions comprised within the session data and/or can determine the probability of interaction sequences not explicitly included within the interactions and/or session data.

At 906, the method 900 can comprise reducing (e.g., via the optimization component 502), by the system 100, one or more navigation distances between the objects based on the one or more transition probability matrices. For example, the reducing at 906 can be performed in accordance with one or more of the mathematical relationships depicted in Equation 1. For instances, the navigation distance between the one or more first objects and the one or more second objects can be reduced based on the probability of the user transitioning from the one or more first objects to the one or more second objects, as determined by the one or more transition possibility matrices. In one or more embodiments, the navigation distance can be expressed as a mathematically valid distance between the objects (e.g., a physical distance between the one or more first objects and the one or more second objects on a display presenting the initial design layout).

At 908, the method 900 can comprise generating (e.g., via the design component 108), by the system 100, one or more design layouts (e.g., personalized design layouts) of the one or more user interfaces by adjusting the one or more initial design layouts based on the interactions and one or more design perturbation preferences that can define a permissible degree of change from the one or more initial design layouts. The altering at 908 can comprise reducing the navigation distance in accordance with 906 in accordance with the one or more design perturbation preferences. In one or more embodiments, the one or more design perturbation preferences can be manually set by one or more users of the application software via adjustment to the "λ" parameter depicted in Equation 1 (e.g., thereby delineating the amount of weight associated with design consistency). In various embodiments, the one or more design perturbation preferences can be determined autonomously by the system 100 (e.g., via the minimalization component 602 and/or optimization component 502). For example, the method 900 can comprise determining the one or more design perturbation preferences through multiple adjustments to the "λ" parameter and/or monitoring the resulting effects on navigation distance experienced by the user via a feedback loop, as described with regards to one or more embodiments herein. For instance, the permissible degree of change can be the amount of design perturbation that can facilitate reducing the expected navigation distance while not increasing the amount of observed navigation distance traversed by the user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
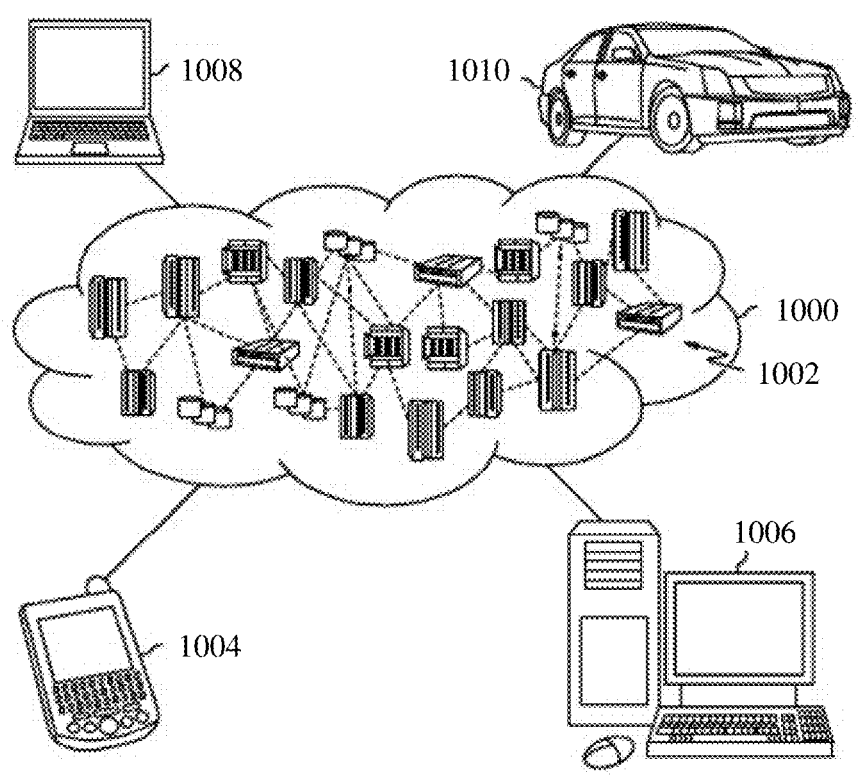
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
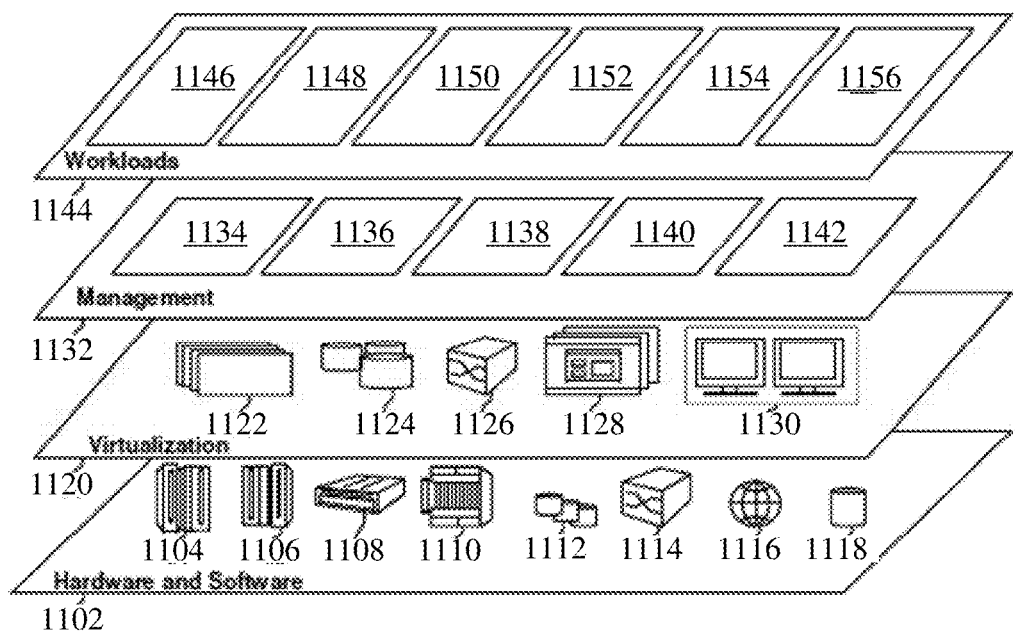
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and design layout personalization 1156. Various embodiments of the present invention can utilize the cloud computing environment described with reference to FIGS. 10 and 11 to collect and/or analyze interaction data via one or more user interfaces and/or generate one or more personalized design layouts.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
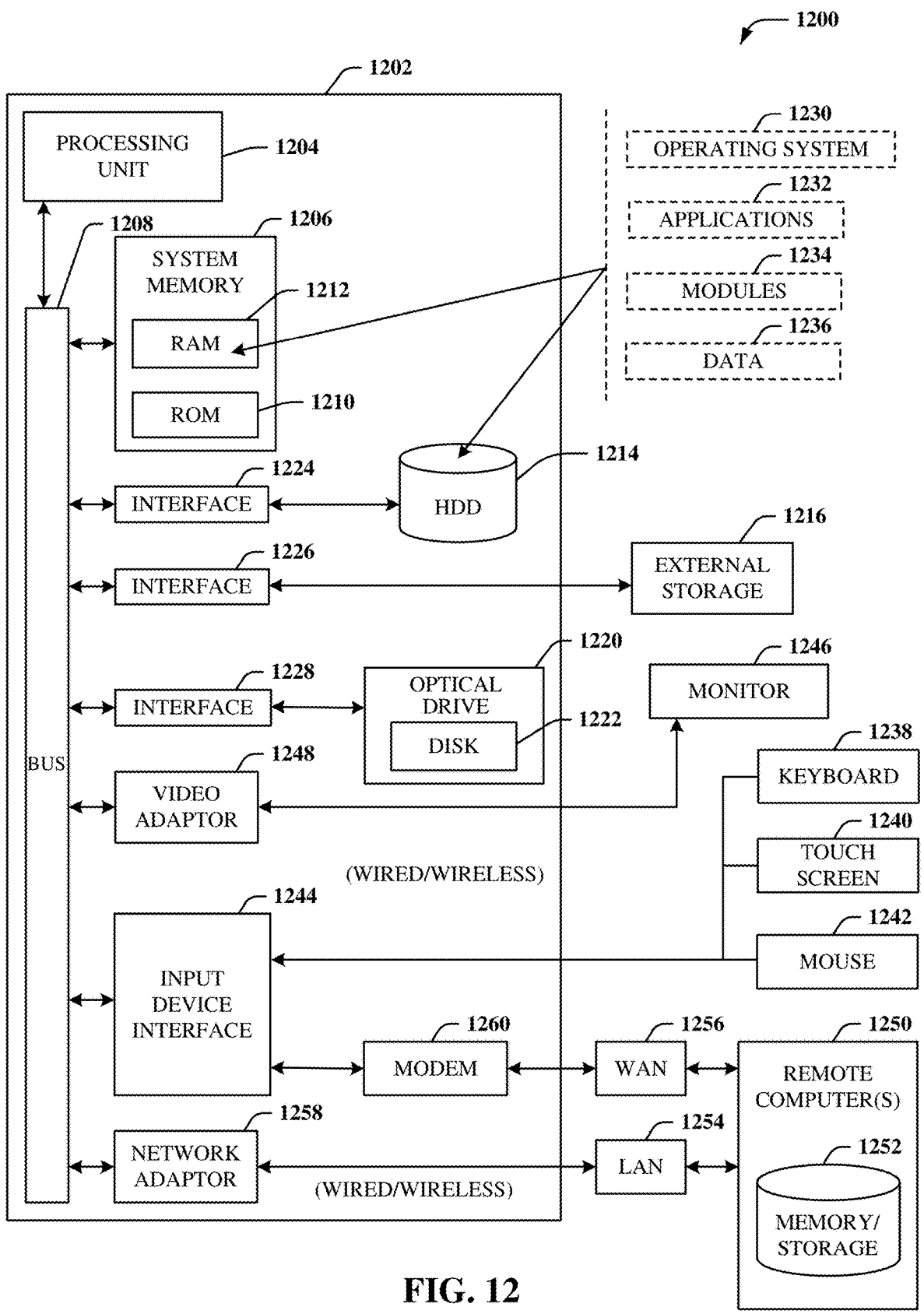
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor, operably coupled to the memory, and that executes the computer executable components stored in the memory, wherein the computer executable components comprise:
      an optimization component that balances determination of a personalized design layout of a user interface for application software concurrently with satisfaction of a design perturbation preference, wherein the determination of the personalized design layout of the user interface comprises reduction of a navigation distance between objects based on a transition probability matrix, wherein the transition probability matrix is employed to determine probability of a user interaction from a first application object of a plurality of application objects to a second application object of the plurality of application objects, wherein the transition probability matrix is generated based on a count of transitions between ones of the plurality of application objects, and wherein the design perturbation preference is associated with a degree of change from an initial design layout to generate the personalized design layout.

2. The system of claim 1, further comprising:
   a design component that generates the personalized design layout for the user interface by adjusting the initial design layout of the user interface based on interactions via the user interface and the design perturbation preference associated with the initial design layout.

3. The system of claim 2, wherein the interactions comprise at least one member selected from a group consisting of engagement of the objects via the user interface and prolonged display of the objects via the user interface.

4. The system of claim 2, wherein the system populates the transition probability matrix with values greater than or equal to a threshold value that defines outliers in session data that characterizes a sequence in which the objects of the initial design layout are unintentionally interacted.

5. The system of claim 1, wherein the navigation distance is a physical distance between a first object of the objects and a second object of the objects and are on a display that presents the initial design layout.

6. The system of claim 1, further comprising:
   a minimalization component that determines a minimal amount of design perturbation that achieves the navigation distance.

7. The system of claim 1, wherein the optimization component also determines the personalized design layout by reducing the navigation distance based on a probability matrix derived from interactions identified via the user interface.

8. A computer-implemented method, comprising:
   balancing, by a device operatively coupled to a processor, determination of a personalized design layout of a user interface for application software concurrently with satisfying a design perturbation preference, wherein the determination comprises reduction of a navigation distance between objects based on a transition probability matrix, wherein the transition probability matrix is generated based on a weighted approach that affords different types of interactions between different ones of a plurality of application objects, and wherein an explicit type of interaction of the types of interactions is afforded a first weight and an implicit type of interaction of the types of interactions is afforded a second weight, wherein the first weight is distinct from the second weight.

9. The computer-implemented method of claim 8, further comprising:
   generating, by the device, personalized design layout for the user interface by adjusting the initial design layout of the user interface based on interactions via the user interface and the design perturbation preference associated with the initial design layout.

10. The computer-implemented method of claim 9, wherein the interactions comprise at least one member selected from a group consisting of engagement of the objects via the user interface and prolonged display of the objects via the user interface.

11. The computer-implemented method of claim 8, wherein the device populates the transition probability matrix with values greater than or equal to a threshold value that defines outliers in session data that characterizes a sequence in which the objects of the initial design layout are infrequently interacted.

12. The computer-implemented method of claim 8, wherein the navigation distance is a physical distance between a first object of the objects and a second object of the objects and are on a display that presents an initial design layout.

13. The computer-implemented method of claim 8, further comprising:
   determining, by the device, a minimal amount of design perturbation that achieves the navigation distance.

14. The computer-implemented method of claim 8, further comprising:
   determining, by the device, the personalized design layout by reducing the navigation distance based on a probability matrix derived from interactions identified via the user interface.

15. A computer program product for improving operability of application software, the computer program product comprising a computer readable storage medium having program instructions embodied therewith, the program instructions executable by a processor to cause the processor to:
   balance, by the processor, determination of a personalized design layout of a user interface for application software with satisfaction of a design perturbation preference, wherein the determination comprises reduction of a navigation distance between objects based on a transition probability matrix, wherein the transition probability matrix is generated based on a weighted approach that affords different types of interactions between different ones of a plurality of application objects.

16. The computer program product of claim 15, wherein the instructions are further executable to cause the processor to:
   generate, by the processor, the personalized design layout for the user interface by adjusting an initial design layout of the user interface based on interactions via the user interface and the design perturbation preference associated with the initial design layout.

17. The computer program product of claim 16, wherein the interactions comprise at least one member selected from a group consisting of engagement of the objects via the user interface and prolonged display of the objects via the user interface.

18. The computer program product of claim 15, wherein the instructions are further executable to cause the processor to populate the transition probability matrix with values greater than or equal to a threshold value that defines outliers in session data that characterizes a sequence in which the objects of the initial design layout are interacted.

19. The computer program product of claim 15, wherein the navigation distance is a physical distance between a first object of the objects and a second object of the objects and are on a display that presents an initial design layout.

20. The computer program product of claim 15, wherein the instructions are further executable to cause the processor to:
    determine, by the processor, a minimal amount of design perturbation that achieves the navigation distance.

\* \* \* \* \*